United States Patent
Mori

(10) Patent No.: US 7,182,528 B2
(45) Date of Patent: Feb. 27, 2007

(54) DIFFRACTIVE GRATING MEMBER AND OPTICAL COMMUNICATION MODULE

(75) Inventor: Nobuyoshi Mori, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 11/348,307

(22) Filed: Feb. 7, 2006

(65) Prior Publication Data

US 2006/0177179 A1    Aug. 10, 2006

(30) Foreign Application Priority Data

Feb. 10, 2005    (JP)    .............................. 2005-034348

(51) Int. Cl.
 G02B 6/36 (2006.01)
 H04J 14/02 (2006.01)
(52) U.S. Cl. ............................. 385/93; 385/14; 385/31; 385/33; 385/37; 385/92; 385/94; 398/82; 398/84; 398/87; 398/88
(58) Field of Classification Search ................ 385/11, 385/14, 31, 37, 88, 89, 93, 94, 24, 33, 34, 385/92; 398/82, 84, 87, 88
See application file for complete search history.

(56) References Cited

U.S. PATENT DOCUMENTS

| 4,748,614 | A | 5/1988 | Dammann et al. ......... 385/37 X |
| 6,084,710 | A * | 7/2000 | Katsuma ..................... 359/569 |
| 6,400,509 | B1 * | 6/2002 | Sappey et al. .............. 359/571 |
| 2004/0169929 | A1 * | 9/2004 | Sato et al. ................... 359/558 |
| 2006/0023212 | A1 * | 2/2006 | Nishii et al. ................ 356/328 |

FOREIGN PATENT DOCUMENTS

| EP | 0 303 355 | 2/1989 | ............... 385/31 X |
| JP | 2003-344715 | 12/2003 | ............... 385/31 X |
| WO | WO 02/21522 A1 | 3/2002 | ............... 385/31 X |
| WO | WO 03/060891 A2 | 7/2003 | ............... 385/31 X |

OTHER PUBLICATIONS

J. Cowan, "Aztec Surface-Relief Volume Diffractive Structure", Journal of the Optical Society of America, vol. 7, Aug. 1990, No. 8, pp. 1529-1544.
H. Dammann, "Color Separation Gratings", Applied Optics, vol. 17, No. 15, Aug. 1978, pp. 2273-2279.
Z. Jaroszewicz et al., "Determination of Phase-step Errors of Kinoform Gratings from their Diffraction Efficiencies", Optical Engineering, vol. 40, No. 5, May 2001, pp. 692-697.

* cited by examiner

*Primary Examiner*—Brian M. Healy
(74) *Attorney, Agent, or Firm*—Finnegan, Henderson, Farabow, Garrett & Dunner, L.L.P.

(57) ABSTRACT

The present invention relates to a diffractive grating member and to an optical communication module. The optical communication module includes a semiconductor laser; a coupling optical system for coupling a light flux with a wavelength of $\lambda 1$ emitted by the semiconductor laser to an optical fiber; and two light-receiving elements for receiving at least two light fluxes each having wavelengths $\lambda 2$ and $\lambda 3$ emitted from an end surface of the optical fiber. The coupling optical system has a diffractive structure, and the coupling optical system changes paths of light fluxes each having wavelengths $\lambda 1$, $\lambda 2$ and $\lambda 3$ into relatively different directions such that the light flux with the wavelength $\lambda 1$ emitted by the semiconductor laser enters into the optical fiber and each of the at least two light fluxes each having the wavelengths $\lambda 2$ and $\lambda 3$ enters into each of the two light-receiving elements.

26 Claims, 7 Drawing Sheets

DIFFRACTIVE GRATING MEMBER AND OPTICAL COMMUNICATION MODULE

This application is based on Japanese Patent Application No. 2005-034348 filed on Feb. 10, 2005 in Japanese Patent Office, the entire content of which is hereby incorporated by reference.

BACKGROUND OF THE INVENTION

The present invention relates to a diffractive grating member and an optical communication module.

In the conventional diffractive grating member for an optical pickup device that reads signals from two types of media of CD and DVD, a laser beam with wavelength 785 nm used for reading a CD and a laser beam with wavelength 655 nm used for reading a DVD are targets, and a laser beam with a wavelength for CD and a laser beam with a wavelength for DVD are made to be of the same optical axis, and signals are detected by a single light-receiving element. Therefore, an optical path difference between adjoining diffractive surfaces is made to be the same as a certain wavelength, and a step-shaped grating on which six surfaces are formed is used.

Further, in the optical communication field, well-known is an optical communication module in which two wavelengths are used respectively for a receiving side and a transmitting side, and which separates the light fluxes with two wavelengths to couple light fluxes from a semiconductor laser to an optical fiber and to couple light fluxes from the optical fiber to the light-receiving element. In the following Patent Document 1, there is used a step-shaped grating wherein a wavelength of a semiconductor laser is made to be 1310 nm and a wavelength from an optical fiber is made to be 1550 nm, while, an optical path difference between adjoining diffractive surfaces is made to be the same as a certain wavelength, and a step-shaped grating on which three surfaces are formed is used.

(Patent Document 1) TOKUKAI No. 2003-344715

Though the step-shaped grating can separate light fluxes with two wavelengths, it is difficult to separate light fluxes with three or more wavelengths. In the optical communication field, in particular, when attaining 3-wavelength optical communication module wherein light from a semiconductor laser is coupled to an optical fiber stably without being affected by a slight fluctuation of wavelength, and light respectively with two wavelengths from an optical fiber are separated to be guided to different light-receiving elements, it has been difficult for the conventional step-shaped grating to separate light from an optical fiber sufficiently.

SUMMARY OF THE INVENTION

In view of the problems in the conventional technology mentioned above, an object of the invention is to provide an optical communication module capable of utilizing three wavelengths by separating light fluxes having respectively different wavelengths from an optical fiber at sufficient angles of diffraction, and a diffractive grating member capable of separating light having respectively different wavelengths so that three wavelengths may be used.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

Figure 13:
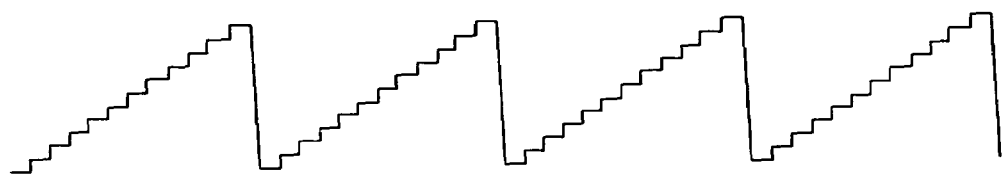
Figure 14:
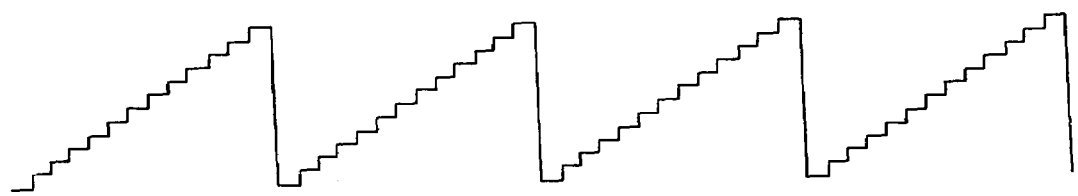
Figure 15:
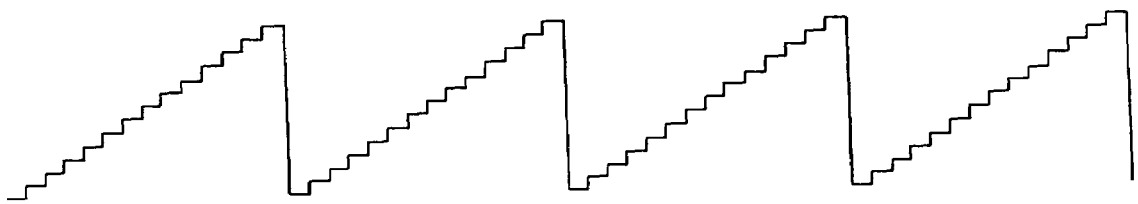

Each of FIGS. 13, 14 and 15 is a schematic cross-sectional view of the diffractive grating member 15 in each of Examples 8, 9 and 10 in Table 3.

DETAILED DESCRIPTION OF THE PREFERRED EMBODIMENT

Preferable structures for attaining the object of the invention stated above are explained below.

For attaining the object mentioned above, the optical communication module relating to the invention includes a semiconductor laser; a coupling optical system for coupling a light flux with a wavelength of $\lambda1$ emitted by the semiconductor laser to an optical fiber; and two light-receiving elements for receiving at least two light fluxes each having wavelengths $\lambda2$ and $\lambda3$ emitted from an end surface of the optical fiber. The coupling optical system is arranged between the semiconductor laser and the two light-receiving elements, and the optical fiber, and has a diffractive structure on at least one surface of the coupling optical system. The coupling optical system changes paths of light fluxes each having wavelengths $\lambda1$, $\lambda2$ and $\lambda3$ into relatively different directions such that the light flux with the wavelength $\lambda1$ emitted by the semiconductor laser enters into the optical fiber and each of the at least two light fluxes each having the wavelengths $\lambda2$ and $\lambda3$ enters into each of the two light-receiving elements being away from each other.

In this optical communication module, owing to the diffractive structure provided on at least one surface of the coupling optical system, a light flux with wavelength $\lambda1$ emitted from the semiconductor laser enters the optical fiber, and light with at least two wavelengths λ2 and λ3 both emitted from the optical fiber may enter respectively two light-receiving elements arranged to be away from each other, thus, light respectively with different wavelengths emitted from the optical fiber are separated at sufficient angle of diffraction, and three wavelengths can be used.

When the wavelengths λ1, λ2 and λ3 in the aforesaid optical communication module satisfy the following conditions:

$$1280 \text{ nm} \leq \lambda 1 \leq 1340 \text{ nm},$$

$$1480 \text{ nm} \leq \lambda 2 \leq 1500 \text{ nm and}$$

$$1530 \text{ nm} \leq \lambda 3 \leq 1570 \text{ nm},$$

it is preferable that the diffractive structure is formed by a plurality of step-shaped grating sections provided repeatedly in the direction perpendicular to an optical axis. Each of the step-shaped grating sections includes a predefined number of steps each having a rising surface portion rising in the optical axis direction and a diffractive surface portion formed to be protruded from the rising surface portion. Each of the steps of the step-shaped grating sections provides an optical path difference being a multiple of an approximately integer of the wavelength λ1 to the light fluxes with the wavelength λ1 passing through adjoining diffractive surface portions, and each of the step-shaped grating sections includes 12 diffractive surface portions.

In this case, it is preferable that each of the steps gives an optical path difference being about twice the wavelength λ1 to light fluxes with the wavelength λ1 passing the adjoining diffractive surface portions. Or, it is preferable that each of the steps gives an optical path difference being about the wavelength λ1 to the light fluxes with the wavelength λ1 passing through the adjoining diffractive surface portions.

Further, when each of the steps provides an optical path difference being M times of the wavelength λ1 to light fluxes with the wavelength λ1 passing through the adjoining diffractive surface portions, and M is determined so that the following conditional expression (1) or (2) is satisfied, an amount of diffracted light can be adjusted.

$$0.9 < M < 1.1 \tag{1}$$

$$1.9 < M < 2.1 \tag{2}$$

Further, it is preferable the diffractive structure makes diffracted light fluxes from light fluxes each having wavelengths λ2 and λ3 and emitted from the optical fiber, and a diffracted light fluxes with a maximum diffraction efficiency corresponding to the wavelengths λ2 and a diffracted light fluxes with a maximum diffraction efficiency corresponding to the wavelengths λ3 have different diffraction orders each other. Owing to this, three light fluxes each having a different wavelength can be refracted and separated. In particular, when diffracted light fluxes each having a different diffraction order that makes diffraction efficiency maximum are generated for light fluxes each having a different wavelength coming from the optical fiber, the light fluxes each having a different wavelength coming from the optical fiber can be separated at the sufficient angle of diffraction. In addition, if the diffractive structure makes a diffracted light flux with a larger diffraction order from a light flux with a larger wavelength, a difference of the angle of diffraction between respective wavelengths can be made to be great sufficiently, which is preferable.

For example, when the wavelengths λ1, λ2 and λ3 satisfy the following conditions:

$$1280 \text{ nm} \leq \lambda 1 \leq 1340 \text{ nm},$$

$$1480 \text{ nm} \leq \lambda 2 \leq 1500 \text{ nm and}$$

$$1530 \text{ nm} \leq \lambda 3 \leq 1570 \text{ nm},$$

the diffractive structure makes a $0^{th}$ order diffracted light flux being a transmitting light flux, from the light flux with the wavelength λ1, the diffractive structure also makes a third order diffracted light flux having a maximum diffraction efficiency from the light flux with the wavelength λ2, and the diffractive structure also makes a fourth order diffracted light flux having a maximum diffraction efficiency from the light flux with the wavelength λ, whereby, light fluxes with respective wavelengths from the optical fiber can be separated at a sufficient angle of diffraction and an amount of diffracted light grows greater.

Further, when the wavelengths λ1, λ2 and λ3 satisfy the following conditions:

$$1280 \text{ nm} \leq \lambda 1 \leq 1340 \text{ nm},$$

$$1480 \text{ nm} \leq \lambda 2 \leq 1500 \text{ nm and}$$

$$1530 \text{ nm} \leq \lambda 3 \leq 1570 \text{ nm},$$

the diffractive structure makes a $0^{th}$ order diffracted light flux being a transmitting light flux, from the light flux with the wavelength λ1, the diffractive structure also makes a first order diffracted light flux having a maximum diffraction efficiency from the light flux with the wavelength λ2, and the diffractive structure also makes a second order diffracted light flux having a maximum diffraction efficiency from the light flux with the wavelength λ3, whereby, light fluxes with respective different wavelengths from the optical fiber can be separated at a sufficient angle of diffraction and an amount of diffracted light grows greater.

When the wavelengths λ1, λ2 and λ3 satisfy the following conditions:

$$1280 \text{ nm} \leq \lambda 1 \leq 1340 \text{ nm},$$

$$1480 \text{ nm} \leq \lambda 2 \leq 1500 \text{ nm and}$$

$$1530 \text{ nm} \leq \lambda 3 \leq 1570 \text{ nm},$$

it is preferable the diffractive structure is formed by a plurality of step-shaped grating sections provided repeatedly in the direction perpendicular to an optical axis. It is also preferable that each of the step-shaped grating sections includes a predefined number of steps each having a rising surface portion rising in the optical axis direction and a diffractive surface portions formed to be protruded from the rising surface portion. It is also preferable that each of the steps of the step-shaped grating sections provides an optical path difference being a multiple of an approximately integer of the wavelength λ1 to the light fluxes with the wavelength λ1 passing through adjoining diffractive surface portions, and each of the step-shaped grating sections includes 9 diffractive surface portions. Due to this, light fluxes respectively with different wavelengths emitted from the optical fiber can be separated at a sufficient angle of diffraction, and diffraction efficiency for light with each of three wavelengths is improved.

In this case, it is preferable that each of the steps provides an optical path difference being approximately twice of the wavelength λ1 to light fluxes with the wavelength λ1 passing through the adjoining diffractive surface portions.

Further, when each of the steps provides an optical path difference being M times of the wavelength λ1 to light fluxes with the wavelength λ1 passing through the adjoining diffractive surface portions, and M is determined so that the following conditional expression (2) is satisfied, an amount of diffracted light can be adjusted.

$$1.9 < M < 2.1 \quad (2)$$

Further, when the wavelengths λ1, λ2 and λ3 satisfy the following conditions:

1280 nm≦λ1≦1340 nm, 1480 nm≦λ2≦1500 nm and 1530 nm≦λ3≦1570 nm, the diffractive structure makes a $0^{th}$ order diffracted light flux being transmitting light flux, from the light flux with the wavelength λ1, makes a second order diffracted light flux having a maximum diffraction efficiency from the light flux with the wavelength λ2, and makes a third order diffracted light flux having a maximum diffraction efficiency from the light flux with the wavelength λ3, whereby, light fluxes with respective wavelengths from the optical fiber can be separated at a sufficient angle of diffraction and an amount of diffracted light grows greater.

When the wavelengths λ1, λ2 and λ3 satisfy the following conditions:

1280 nm≦λ1≦1340 nm, 1480 nm≦λ2≦1500 nm and 1530 nm≦λ3≦1570 nm, it is preferable that the diffractive structure is formed by a plurality of step-shaped grating sections provided repeatedly in the direction perpendicular to an optical axis. Each of the step-shaped grating sections includes a predefined number of steps each having a rising surface portion rising in the optical axis direction and a diffractive surface portion formed to be protruded from the rising surface portion. Each of the steps of the step-shaped grating sections provides an optical path difference being a multiple of an approximately integer of the wavelength λ1 to the light fluxes with the wavelength λ1 passing through adjoining diffractive surface portions, and each of the step-shaped grating sections includes 11 diffractive surface portions. Due to this, light fluxes respectively with different wavelengths emitted from the optical fiber can be separated at a sufficient angle of diffraction, and diffraction efficiency for light with each of three wavelengths is improved.

In this case, it is preferable that each of the steps provides an optical path difference being approximately same as the wavelength λ1 to light fluxes with the wavelength λ1 passing through the adjoining diffractive surface portions.

Further, when each of the steps provides an optical path difference being M times of the wavelength λ1 to light fluxes with the wavelength λ1 passing through the adjoining diffractive surface portions, and M is determined so that the following conditional expression (1) is satisfied, an amount of diffracted light can be adjusted.

$$0.9 < M < 1.1 \quad (1)$$

Further, when the diffractive structure makes a $0^{th}$ order diffracted light flux being a transmitting light flux, from the light flux with the wavelength λ1, the diffractive structure also makes a first order diffracted light flux having a maximum diffraction efficiency from the light flux with the wavelength λ2, and the diffractive structure also makes a second order diffracted light flux having a maximum diffraction efficiency from the light flux with the wavelength λ3, whereby, light fluxes with respective wavelengths from the optical fiber can be separated at a sufficient angle of diffraction and an amount of diffracted light grows greater.

Further, the diffractive surface portion inclines so as to reduce a height of the diffractive surface portion in a direction increasing a height of each of the step-shaped grating sections. The diffractive surface portion straightly transmits an entering light flux with the wavelength λ1. The diffractive surface portion diffracts each of entering light fluxes each having the wavelengths λ2 and λ3 so as to provide different diffractive orders to each of the entering light fluxes. These allow separating light having a different wavelength coming from the optical fiber at a further sufficient angle of diffraction.

A diffractive grating member according to the invention is for separating light fluxes each having different wavelengths and includes a diffractive-grating section formed on a surface of the diffractive grating member perpendicular to an optical axis; and a plurality of step-shaped grating sections provided repeatedly on the diffractive-grating section in the direction perpendicular to an optical axis. Each of the step-shaped grating sections includes a predefined number of steps each having a rising surface portion rising in the optical axis direction and a diffractive surface portion formed to be protruded from the rising surface portion. Each of the steps of the step-shaped grating sections provides an optical path difference being a multiple of an approximately integer of the wavelength λ1 to the light fluxes with the wavelength λ1 passing through adjoining diffractive surface portions. Each of the step-shaped grating sections includes 9, 11, or 12 diffractive surface portions.

In this diffractive grating member, the step-shaped grating section is formed to be provided with prescribed number of steps each having a rising surface along the optical axis direction and a diffractive surface portion formed to be protruded from the rising surfaces. Each of the steps gives to incident light that passes through the adjoining diffractive surface portions, an optical path difference representing a multiple of an integer of a wavelength of the incident light. The number of diffractive surface portions is 9, 11 or 12. These allow that light having a different wavelength emerging from the optical fiber is separated at a sufficient angle of diffraction, efficiency of diffraction for light having each of three wavelengths is improved and three wavelengths can be used.

When the wavelengths λ1, λ2 and λ3 satisfy the following conditions:

1280 nm≦λ1≦1340 nm, 1480 nm≦λ2≦1500 nm and 1530 nm≦λ3≦1570 nm, it is preferable that each of the steps provides an optical path difference being a multiple of an approximately integer of the wavelength λ1 of the light fluxes with the wavelength λ1 passing through adjoining diffractive surface portions. In this case, it is more preferable that each of the steps provides an optical path difference being a multiple of a non-integer of the wavelength λ2 and λ3 of the light fluxes each with the wavelength λ2 and λ3 passing through adjoining diffractive surface portions.

In this case, when each of the steps provides an optical path difference being M times of the wavelength $\lambda 1$ to light fluxes with the wavelength $\lambda 1$ passing through the adjoining diffractive surface portions, and M is determined so that the following conditional expression (1) or (2) is satisfied, an amount of diffracted light can be adjusted.

$$0.9<M<1.1 \tag{1}$$

$$1.9<M<2.1 \tag{2}$$

Further, it is preferable that a raising surface of each end of the plurality of step-shaped grating sections or a raising surface placed an end portion of each of the plurality of step-shaped grating sections and providing a largest step difference, inclines in a direction to a lower step of the step-shaped grating section owing to this, an yield in manufacturing of the diffractive grating members through injection molding is improved.

It is preferable that the above optical communication module, includes two light-receiving elements for receiving at least three light fluxes each having wavelengths $\lambda 2$, $\lambda 3$ and $\lambda 4$ emitted from an end surface of the optical fiber. Further it is preferable that when the wavelengths $\lambda 1$, $\lambda 2$, $\lambda 3$ and $\lambda 4$ satisfy following expressions:

$$1280 \text{ nm} \leq \lambda 1 \leq 1340 \text{ nm}$$

$$1480 \text{ nm} \leq \lambda 2 \leq 1500 \text{ nm}$$

$$1530 \text{ nm} \leq \lambda 3 \leq 1570 \text{ nm},$$

$$1600 \text{ nm} \leq \lambda 4 \leq 1620 \text{ nm},$$

the diffractive structure is formed by a plurality of step-shaped grating sections provided repeatedly in the direction perpendicular to an optical axis. Each of the step-shaped grating sections includes a predefined number of steps each having a rising surface portion rising in the optical axis direction and a diffractive surface portion formed to be protruded from the rising surface portion. Each of the step-shaped grating sections provides an optical path difference being a multiple of an integer of the wavelength $\lambda 1$ to the light fluxes with the wavelength $\lambda 1$ passing through adjoining diffractive surface portions, and each of the step-shaped grating sections includes 12, 13, or 14 diffractive surface portions.

In this case, it is preferable that in the above optical communication module, each of the steps of the diffractive structure provides an optical path difference being M times of the wavelength $\lambda 1$ to light fluxes with the wavelength $\lambda 1$ passing through the adjoining diffractive surface portions, and M satisfies the conditional expression (2).

$$1.9<M<2.1 \tag{2}$$

Furthermore, it is preferable that in the optical communication module, when the wavelengths $\lambda 1$, $\lambda 2$, $\lambda 3$ and $\lambda 4$ satisfy followings:

$$1280 \text{ nm} \leq \lambda 1 \leq 1340 \text{ nm}$$

$$1480 \text{ nm} \leq \lambda 2 \leq 1500 \text{ nm}$$

$$1530 \text{ nm} \leq \lambda 3 \leq 1570 \text{ nm},$$

$$1600 \text{ nm} \leq \lambda 4 \leq 1620 \text{ nm},$$

the diffractive structure makes a $0^{th}$ order diffracted light flux being a transmitting light flux, from the light flux with the wavelength $\lambda 1$, the diffractive structure also makes a third order diffracted light flux having a maximum diffraction efficiency from the light flux with the wavelength $\lambda 2$, the diffractive structure also makes a fourth order diffracted light flux having a maximum diffraction efficiency from the light flux with the wavelength $\lambda 3$, and the diffractive structure also makes a fifth order diffracted light flux having a maximum diffraction efficiency from the light flux with the wavelength $\lambda 4$.

Furthermore, it is preferable that in the optical communication module, the diffractive surface portion inclines so as to reduce a height of the diffractive structure in a direction increasing a height of each of the step-shaped grating sections, the diffractive surface portion also straightly transmits an entering light flux with the wavelength $\lambda 1$, and the diffractive surface portion also diffracts each of entering light fluxes each having the wavelengths $\lambda 2$, $\lambda 3$ and $\lambda 4$ so as to provide different diffractive orders to each of the entering light fluxes.

A diffractive grating member relating to the present invention for separating light fluxes each having different wavelengths, includes a diffractive-grating section formed on a surface of the diffractive grating member perpendicular to an optical axis; and a plurality of step-shaped grating sections provided repeatedly on the diffractive-grating section the direction perpendicular to an optical axis. Each of the step-shaped grating sections includes a predefined number of steps each having a rising surface portion rising in the optical axis direction and a diffractive surface portion formed to be protruded from the rising surface portion. Each of the steps of the step-shaped grating sections provides an optical path difference being a multiple of an approximately integer of the wavelength $\lambda 1$ to the light fluxes with the wavelength $\lambda 1$ passing through adjoining diffractive surface portions. Each of the step-shaped grating sections includes 12, 13, or 14 diffractive surface portions.

It is preferable that in the above diffractive grating member, when wavelengths $\lambda 1$, $\lambda 2$, $\lambda 3$ and $\lambda 4$ satisfy followings:

$$1280 \text{ nm} \leq \lambda 1 \leq 1340 \text{ nm}$$

$$1480 \text{ nm} \leq \lambda 2 \leq 1500 \text{ nm}$$

$$1530 \text{ nm} \leq \lambda 3 \leq 1570 \text{ nm},$$

$$1600 \text{ nm} \leq \lambda 4 \leq 1620 \text{ nm},$$

each of the steps provides an optical path difference being a multiple of an approximately integer of the wavelength $\lambda 1$ of the light fluxes with the wavelength $\lambda 1$ passing through adjoining diffractive surface portions. In this case, it is more preferable that each of the steps provides an optical path difference being a multiple of an non-integer of the wavelength $\lambda 2$, $\lambda 3$, and $\lambda 4$ of the light fluxes each with the wavelength $\lambda 2$, $\lambda 3$, and $\lambda 4$ passing through adjoining diffractive surface portions.

Furthermore, it is preferable that in the steps provides an optical path difference being M times of the wavelength $\lambda 1$ to light fluxes with the wavelength $\lambda 1$ passing through the adjoining diffractive surface portions, and $$\text{M satisfies } 1.9<M<2.1.$$

Further, it is preferable that a raising surface of each end of the plurality of step-shaped grating sections or a raising surface placed an end portion of each of the plurality of step-shaped grating sections and providing a largest step difference, inclines in a direction to a lower step of the step-shaped grating section.

The optical communication module relating to the invention makes it possible to separate light having a different wavelength emerging from the optical fiber, and it improves diffraction efficiency of light having each of wavelengths, and makes three or four wavelengths to be utilized owing to this, light having a different wavelength emerging from the optical fiber can be separated by an optical system which is smaller than the conventional one, which can realize downsizing of optical communication modules.

In the diffractive grating member relating to the invention, the number of diffractive surface portions in the step-shaped grating section is 9, 11 or 12, and thereby, the light having a different wavelength can be separated at a sufficient angle of diffraction, the diffraction efficiency of light having each of three wavelengths is improved and three wavelengths can be used. Similarly, the number of diffractive surface portions in the step-shaped grating section is 12, 13 or 14, and thereby, the light having a different wavelength can be separated at a sufficient angle of diffraction, the diffraction efficiency of light having each of four wavelengths is improved and three wavelengths can be used. Therefore, light having a different wavelength can be separated by an optical system which is smaller than the conventional one, and it is possible to realize downsizing of an optical communication module, by applying the diffractive grating member to an optical communication module.

While the preferred embodiments of the present invention have been described using specific terms, such description is for illustrative purposes only, and it is to be understood that changes and variations may be made without departing from the sprit or scope of the appended claims.

<Embodiment 1>

Figure 1:
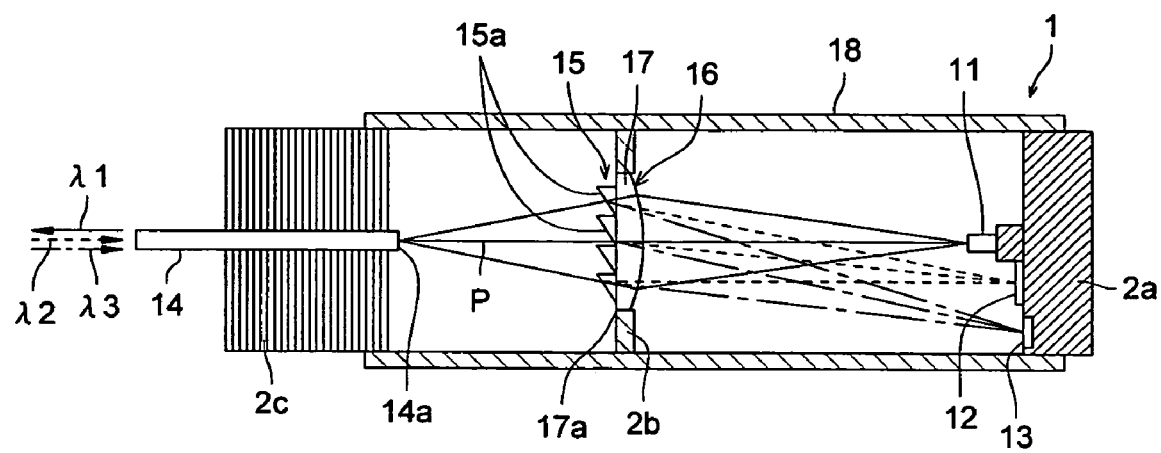
FIG. 1 is a diagram showing conceptually an optical communication module employing a diffractive grating member relating to the present embodiment.
Figure 2:
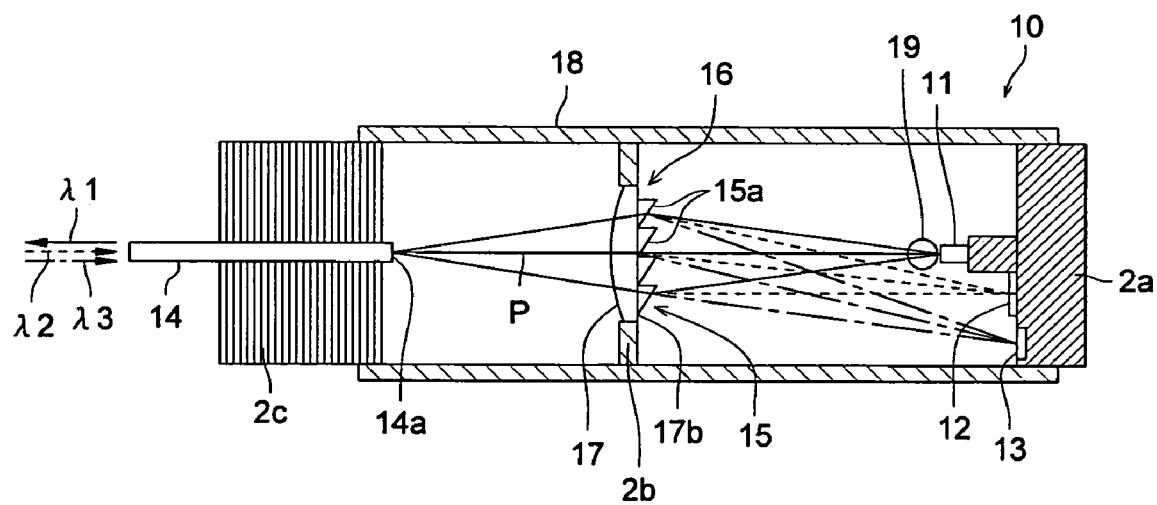
FIG. 2 is a diagram showing conceptually another optical communication module employing a diffractive grating member relating to the present embodiment.
Figure 3:
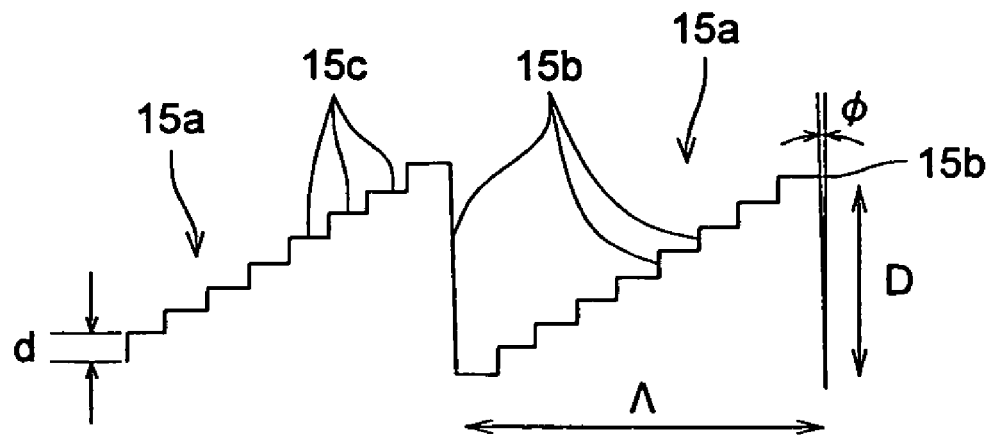
FIG. 3 is a schematic cross-sectional view for illustrating a form of a diffractive grating member relating to the present embodiment.
Figure 4:
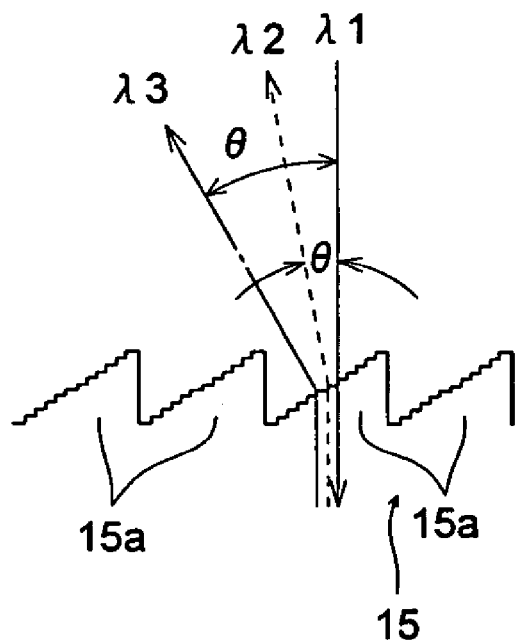
FIG. 4 is an illustration for definitions of angles which are formed when light respectively with three wavelengths are separated by the diffractive grating member shown in FIG. 3.

Embodiment 1 that is that is preferred for practicing the invention will be explained as follows, referring to the drawings. FIG. 1 is a diagram showing conceptually an optical communication module employing a diffractive grating member relating to the present embodiment 1. FIG. 2 is a diagram showing conceptually another optical communication module employing a diffractive grating member relating to the present embodiment 1. FIG. 3 is an illustration for a form of a diffractive grating member relating to the present embodiment 1. FIG. 4 is an illustration for definitions of angles which are formed when light respectively with three wavelengths are separated by the diffractive grating member shown in FIG. 3.

As shown in FIG. 1, optical communication module 1 is structured in a way that the semiconductor laser 11, the light-receiving element 12 and the light-receiving element 13, optical fiber 14, diffractive grating member 15, and coupling optical system 16 is arranged in casing 18. Optical fiber 14 faces to semiconductor laser 11, light-receiving element 12 and light-receiving element 13 with coupling optical system 16 and diffractive grating member 15 standing between them. The semiconductor laser 11, the light-receiving element 12 and the light-receiving element 13 are fixed on the casing 18 through fixing member 2a, coupling lens 17 is fixed on the casing 18 through fixing member 2b, and the optical fiber 14 is fixed on the casing 18 through fixing member 2c.

The coupling optical system 16 includes coupling lens 17, and diffractive grating member 15 (diffractive structure) includes plural step-shaped grating sections 15a provided on surface 17a facing the optical fiber 14 on the coupling lens. Each step-shaped grating section 15a is arranged repeatedly in the direction perpendicular to the optical axis to be formed on surface 17a.

A laser beam having wavelength $\lambda 1$ emitted from semiconductor laser 11 is transmitted through coupling lens 17, and its transmitting light ($0^{th}$ order diffracted light flux) is focused on end face 14a of optical fiber 14, and light (shown with broken lines in FIG. 1) having wavelength $\lambda 2$ emerging from the end face 14a of the optical fiber 14 and light (shown with one-dot chain lines in FIG. 1) with wavelength $\lambda 3$ ($\lambda 2 < \lambda 3$) are diffracted by diffractive grating member 15 to enter respectively light-receiving element 12 and light-receiving element 13.

Namely, the light-receiving elements 12 and 13 are arranged to be away from optical axis P in the direction for step-shaped grating sections 15a of the diffractive grating member 15 to be arranged for the semiconductor laser 11. The light-receiving element 13 with wavelength $\lambda 3$ that is longer than $\lambda 2$ emerging from end face 14a of optical fiber 14 is arranged to be farther than light-receiving element 12 from the semiconductor laser 11. In this way, the light-receiving elements 12 and 13 are arranged to be farther from coupling lens 17 as the wavelength is longer.

The wavelengths $\lambda 1$, $\lambda 2$ and $\lambda 3$ are in the following range, and, for example, $\lambda 1$ is 1310 nm, $\lambda 2$ is 1490 nm and $\lambda 3$ is 1550 nm.

$$1280 \text{ nm} \leq \lambda 1 \leq 1340 \text{ nm}$$

$$1480 \text{ nm} \leq \lambda 2 \leq 1500 \text{ nm}$$

$$1530 \text{ nm } \lambda 3 \leq 1570 \text{ nm}$$

Further, optical communication module 10 shown in FIG. 2 is of the same structure as that of the one shown in FIG. 1 basically, and it functions in the same way, except that ball lens 19 is added to the coupling optical system 16 to be arranged in the vicinity of the semiconductor laser 11, and step-shaped grating sections 15a are provided on the surface 17b closer to the semiconductor laser 11 on the coupling lens 17 of the coupling optical system 16.

Next, step-shaped grating sections 15a of the diffractive grating member 15 shown in FIGS. 1 and 2 will be explained as follows, referring to FIG. 3. As shown in FIG. 3, the step-shaped grating sections 15a is equipped with a plurality of steps each including rising surface portion 15b along the direction (longitudinal direction in FIG. 3) of optical axis P in FIGS. 1 and 2 and of diffractive surface portion 15c that is formed to be protruded from the rising surface portion 15b.

Each step-shaped grating sections 15a is constructed to have the total length (pitch) $\Lambda$ and the total step difference D in which each stair shape that is formed by the rising surface portion 15b having its height d and by the diffractive surface portion 15c is arranged repeatedly and periodically. Further, the rising surface portion 15b that is positioned at an end of the period of steps and has the largest step difference D among rising surface portions 15b is inclined at small angle $\phi$ in the direction to narrow an area of the diffractive surface portion 15c, namely, in the direction to a lower step of step-shaped grating section 15a.

Referring to FIG. 4, there will be explained the state of flexion of light in the case of using the diffractive grating member 15 in FIGS. 1–3 for three wavelengths $\lambda 1$, $\lambda 2$ and $\lambda 3$.

As shown in FIG. 4, in the diffractive grating member 15 formed by plural step-shaped grating sections 15a, incident light $\lambda 1$ emitted from the semiconductor laser 11 in FIGS. 1 and 2 enters in the direction which is opposite to the direction in which incident light $\lambda 2$ and incident light $\lambda 3$ both emerging from optical fiber 14 enter, and the incident light $\lambda 1$ is transmitted as it is without being diffracted. Incidentally, $\lambda 1$ does not need to enter vertically, and it can enter at a field angle of 10° or less in a certain layout. However, the explanation here is given under the condition of vertical entering. On the other hand, light with wavelength $\lambda 2$ and light with wavelength $\lambda 3$ ($\lambda 2<\lambda 3$) are diffracted, and they are diffracted so that $\theta<\theta'$ may be satisfied when $\theta$ represents a diffraction angle of $\lambda 2$ and $\theta'$ represents a diffraction angle of $\lambda 3$.

Next, specific examples 1–4 of the diffractive grating member 15 in FIGS. 3 and 4 will be explained as follows, referring to FIG. 5–FIG. 9. FIG. 6–FIG. 9 respectively show specific examples 1–4 of the diffractive grating member 15 in FIG. 3 and FIG. 4.

When n represents the refractive index of the diffractive grating member 15 in FIGS. 3 and 4, in this case, relational expression (3) holds with M serving as a parameter, between each step height d of the rising surface portion 15b and wavelength $\lambda 1$.

$$(n-1)d = M \cdot \lambda 1 \qquad (3)$$

In the expression above, M is determined to be an integer substantially.

Figure 6:
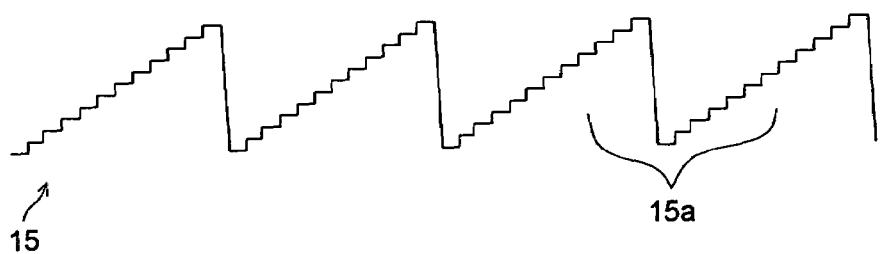
FIG. 6 is a schematic cross-sectional view showing specific example 1 of the diffractive grating member 15 in each of FIG. 3 and FIG. 4.
Figure 7:
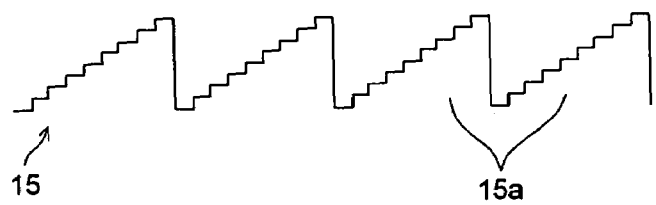
FIG. 7 is a schematic cross-sectional view showing specific example 2 of the diffractive grating member 15 in each of FIG. 3 and FIG. 4.
Figure 8:
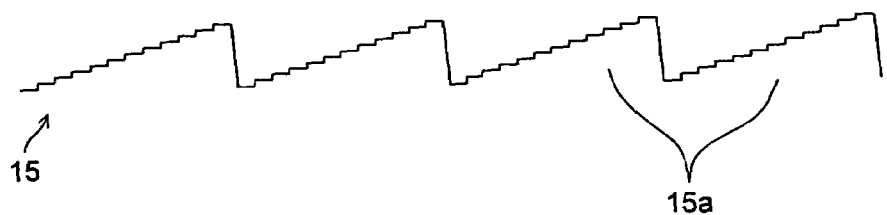
FIG. 8 is a schematic cross-sectional view showing specific example 3 of the diffractive grating member 15 in each of FIG. 3 and FIG. 4.
Figure 9:
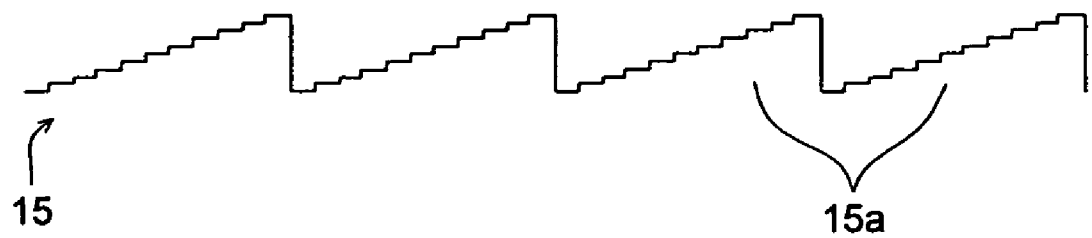
FIG. 9 is a schematic cross-sectional view showing specific example 4 of the diffractive grating member 15 in each of FIG. 3 and FIG. 4.

The specific example 1 in FIG. 6 is a diffractive grating member having a form wherein M is 2 in the aforesaid relational expression (3) and the number of diffractive surface portions is 12. The specific example 2 in FIG. 7 is a diffractive grating member having a form wherein M is 2 and the number of diffractive surface portions is 9. The specific example 3 in FIG. 8 is a diffractive grating member having a form wherein M is 1 and the number of diffractive surface portions is 12. The specific example 4 in FIG. 9 is a diffractive grating member having a form wherein M is 1 and the number of diffractive surface portions is 11.

In FIG. 5–FIG. 9, when M is 2 in the above relational expression (3), each of the steps gives an optical path difference that is twice the wavelength $\lambda 1$ that passes through adjoining diffractive surface portions, and when M is 1, each of the steps gives an optical path difference that is a life size of the wavelength $\lambda 1$ that passes through adjoining diffractive surface portions. In the example in FIG. 5, the number of diffractive surface portions is 3 in the case of M=2.

Further, when a pitch of the diffractive grating member is generally represented by $\Lambda$, the following relational expression (4) holds when $\lambda$ represents a wavelength, $\theta$ represents an angle of diffraction and m represents an order of diffraction.

$$\sin \theta = m\lambda/\Lambda \qquad (4)$$

Figure 5:
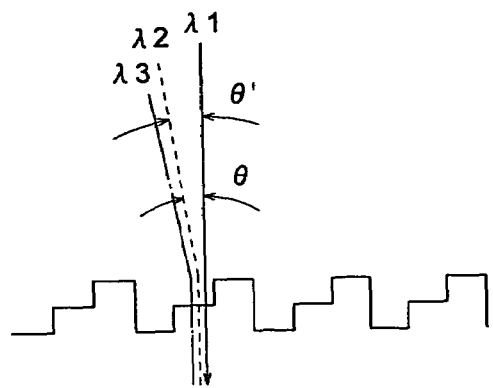
FIG. 5 is a schematic cross-sectional view of the diffractive grating member.

In the example in FIG. 5, a ratio of angle of diffraction $\theta$ to angle of diffraction $\theta'$ respectively for $\lambda 2$ and $\lambda 3$ is relatively small and the diffraction order is the same, while, in the specific examples 1–4 in FIG. 6–FIG. 9, a ratio of angle of diffraction $\theta$ to angle of diffraction $\theta'$ respectively for $\lambda 2$ and $\lambda 3$ is greater than that for the example in FIG. 5 and diffraction orders are different respectively. Accordingly, in optical communication modules 1 and 10 in FIG. 1 and FIG. 2, each of light with wavelength $\lambda 2$ and light with wavelength $\lambda 3$ both emerging from optical fiber 14 is separated at a sufficient angle of diffraction, and a length of the casing 18 in the optical axis direction in each of FIG. 1 and FIG. 2 does not grow greater, and three wavelengths $\lambda 1$–$\lambda 3$ become to be available. Due to the foregoing, it is preferable to generate diffracted light fluxes each being of the different order, for the light fluxes having respectively different wavelengths $\lambda 2$ and $\lambda 3$ coming from an optical fiber, which makes it possible to separate the light fluxes each having a different wavelength coming from the optical fiber at the sufficient angle of diffraction.

As stated above, in the diffractive grating member of the specific examples 1–4 in FIG. 6–FIG. 9, it is possible to improve diffraction efficiency for each light having each of three wavelengths, and to make a separation width of an angle of diffracted light to be large sufficiently by making the number of surfaces of diffractive surface portion 15c of step-shaped grating sections 15a in FIG. 3, thereby, two light fluxes each having a different wavelength can be separated by an optical system smaller than conventional examples, which results in downsizing of an optical communication module that is capable of transmitting and receiving.

With respect to a diffractive grating member of the present embodiment, when it is manufactured through injection molding of plastic, there is a fear that an edge portion of the diffractive surface is damaged by contraction when a molded product is cooled and released from a die, because of step difference D that is higher than that in conventional examples. However, it is possible to prevent such damage of an edge portion of the diffractive surface by inclining raising surface 15b of each end of the plurality of step-shaped grating sections 15a or a raising surface 15b placed an end portion of each of the plurality of step-shaped grating sections 15a and providing the largest step difference D by angle $\phi$ as shown in FIG. 3. After making experiments by changing conditions for molding in various ways, it has become clear that a rate of damage on an edge portion of the diffractive surface can be kept to 1% or less without deteriorating diffraction efficiency, under the condition of $0.2°<\phi<2°$. By preventing a damage on an edge portion of the diffractive surface, the yield rate for manufacturing diffractive grating members 15 can be improved.

EXAMPLES

Next, the invention will be explained more specifically referring to examples, to which, however, the invention is not limited.

Examples 1, 2, 3, 4 and 5 are diffractive grating members having forms corresponding respectively to FIG. 5–FIG. 9 and having conditions shown in the following Table 1. As a ratio of an angle of diffraction in the case of applying each diffractive grating member in Examples 2–5 to three wavelengths ($\lambda 1$, $\lambda 2$, $\lambda 3$) of 1310 nm, 1490 nm and 1550 nm, sin $\theta'$/sin $\theta$ was compared, and diffraction efficiency of each wavelength was compared. In the following examples, diffraction efficiencies is calculated by using scalar approximation. Concerning diffraction efficiency, $0^{th}$ order diffracted light for 1310 nm ($\lambda 1$) was made to be 100%. Namely, it is possible to make efficiency of $0^{th}$ order diffracted light with $\lambda 1$ and efficiency of another wavelength to be balanced by inclining a diffractive surface portion properly or by adjusting a height (value of M) of each-step, and in this case, 1310 nm is made to be 100% for the purpose of explaining efficiency and diffracting actions.

TABLE 1

|  | Example 1 | Example 2 | Example 3 | Example 4 | Example 5 |
| --- | --- | --- | --- | --- | --- |
| M | 2 | 2 | 2 | 1 | 1 |
| Number of diffractive surfaces | 3 | 12 | 9 | 12 | 11 |
| Order of $\lambda 1$ | 0 | 0 | 0 | 0 | 0 |
| Order of $\lambda 2$ | 1 | 3 | 2 | 1 | 1 |
| Order of $\lambda 3$ | 1 | 4 | 3 | 2 | 2 |

TABLE 1-continued

|  | Example 1 | Example 2 | Example 3 | Example 4 | Example 5 |
|---|---|---|---|---|---|
| Diffraction efficiency $\lambda 1$ | 100% | 100% | 100% | 100% | 100% |
| Diffraction efficiency $\lambda 2$ | 57% | 81% | 68% | 39% | 59% |
| Diffraction efficiency $\lambda 3$ | 68% | 64% | 66% | 90% | 75% |
| sin $\theta'$/sin $\theta$ | 1.04 | 1.39 | 1.56 | 2.08 | 2.08 |

As is understood from Table 1, a ratio of an angle of diffraction (sin $\theta'$/sin $\theta$) of wavelength $\lambda 2$ to wavelength $\lambda 3$ is only 1.04 and the diffraction order is the same in the Example 1, and when light with $\lambda 2$ and light with $\lambda 3$ are separated on the diffractive grating member in the Example 1, a distance required for the separation grows greater, resulting in an extremely large optical system and an optical communication module is extended in the optical axis direction. In contrast to this, in the present Examples 2–5, a ratio of the angle of diffraction (sin $\theta'$/sin $\theta$) is about 1.4 or more and the diffraction order for $\lambda 2$ and $\lambda 3$ is different, and thereby, $\lambda 2$ and $\lambda 3$ can be separated with a small distance for separation, resulting in an optical communication module that is short in the optical axis direction. Further, diffraction efficiency is also sufficient.

As is understood from the examples, the diffraction order that makes a diffraction efficiency to be maximum varies depending on each wavelength, and it is possible to make a difference of the angle of diffraction between respective wavelengths to be large sufficiently.

Though diffraction efficiency in the case of wavelength $\lambda 2$ is as low as 39% in Example 4, a height of a step in the Example 4 was adjusted and thereby, diffraction efficiency was adjusted in Examples 6 and 7, as shown in the following Table 2.

TABLE 2

| M | Example 4 1 | Example 6 1.01 | Example 7 1.025 |
|---|---|---|---|
| Number of diffractive surfaces | 12 | 12 | 12 |
| Order of $\lambda 1$ | 0 | 0 | 0 |
| Order of $\lambda 2$ | 1 | 1 | 1 |
| Order of $\lambda 3$ | 2 | 2 | 2 |
| Diffraction efficiency $\lambda 1$ | 100% | 95% | 74% |
| Diffraction efficiency $\lambda 2$ | 39% | 56% | 80% |
| Diffraction efficiency $\lambda 3$ | 90% | 83% | 64% |

By adjusting a value of M in relational expression (1), it is possible to avoid an extremely low diffraction efficiency, as shown in Table 2. Thus, a height of a step can be selected in accordance with an amount of light required by each wavelength.

In FIG. 1 and FIG. 2, after semiconductor laser 11 is emitted, light with wavelength $\lambda 1$ passes through coupling optical system 16 including diffractive grating member 15, and enters end face 14a of optical fiber 14, and in this case, coupling loss is caused, and how to select diffraction efficiency for $\lambda 1$ is important, because both diffraction efficiency and coupling efficiency need to be considered. With respect to M in relational expression (3), if it is selected to be within a range of the relational expression (1) or (2), an amount of light of $0^{th}$ order diffracted light for $\lambda 1$ does not become too small, and a sufficient amount of light can be transmitted even when efficiency of coupling with optical fiber is considered.

Though there have been explained above preferred embodiments for practicing the invention, the invention is not limited to these embodiments, and they can be varied variously without departing from the technical spirit and scope of the invention. For example, ball lens 19 may be arranged in the vicinity of semiconductor laser 11 equally to FIG. 2 in coupling optical system 16.

In addition, though diffractive grating member 15 is structured to be solid with coupling lens 17 in FIGS. 1 and 2, the invention is not limited to this, the diffractive grating member 15 may also be a member that is independent of coupling lens 17 in the coupling optical system 16.

Figure 10:
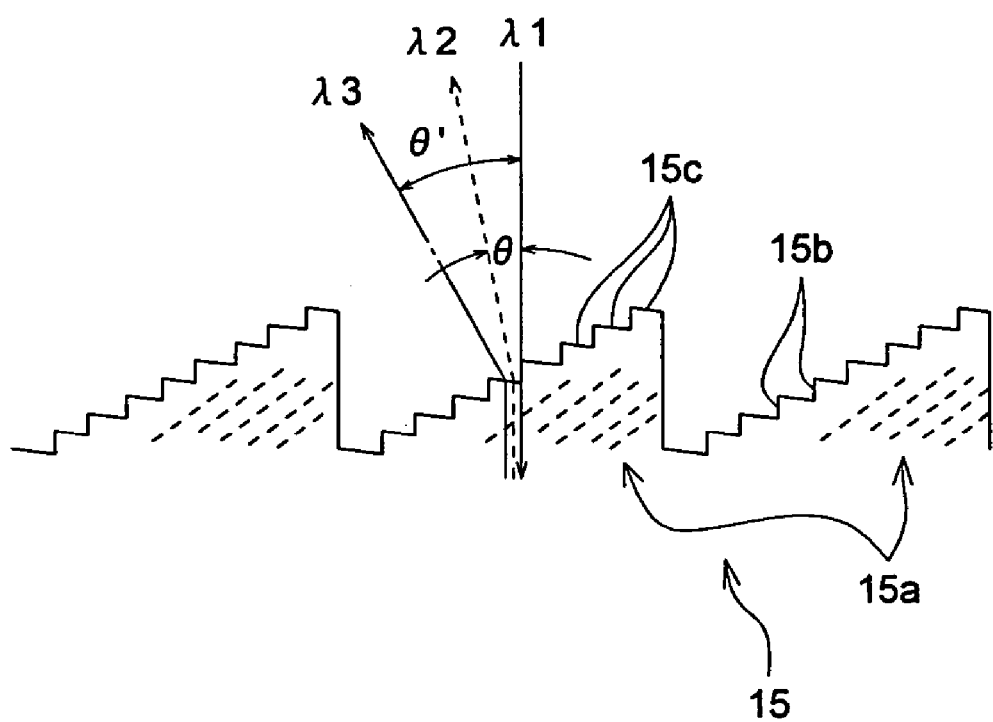
FIG. 10 is a schematic cross-sectional view showing a variation wherein each diffractive surface 15c is inclined in the diffractive grating member 15 in FIG. 3.

Further, diffractive surface portion 15c in diffractive grating member 15 may also be constructed to be inclined. For example, as shown in FIG. 10, the diffractive surface portion inclines so as to reduce a height of the diffractive surface portion in a direction increasing a height of each of the step-shaped grating sections. Namely, it is possible to make sin $\theta'$/sin $\theta$ to be greater for light with wavelength $\lambda 2$ and light with wavelength $\lambda 3$, and thereby to separate light with wavelength $\lambda 2$ and light with wavelength $\lambda 3$ at more sufficient angle, by inclining each diffractive surface portion 15c of step-shaped grating section 15a in the direction perpendicular to the optical axis direction (longitudinal direction in FIG. 10).

Example 2

In the embodiment 1 stated above, there was explained an example wherein two wavelengths $\lambda 2$ and $\lambda 3$ were employed for the light fluxes each having a different wavelength coming form an optical fiber. However, the invention is not limited to these two wavelengths $\lambda 2$ and $\lambda 3$.

In the embodiment 2, there is explained an example wherein three wavelengths $\lambda 2$, $\lambda 3$ and $\lambda 4$ are employed the light fluxes each having a different wavelength coming from an optical fiber.

Figure 11:
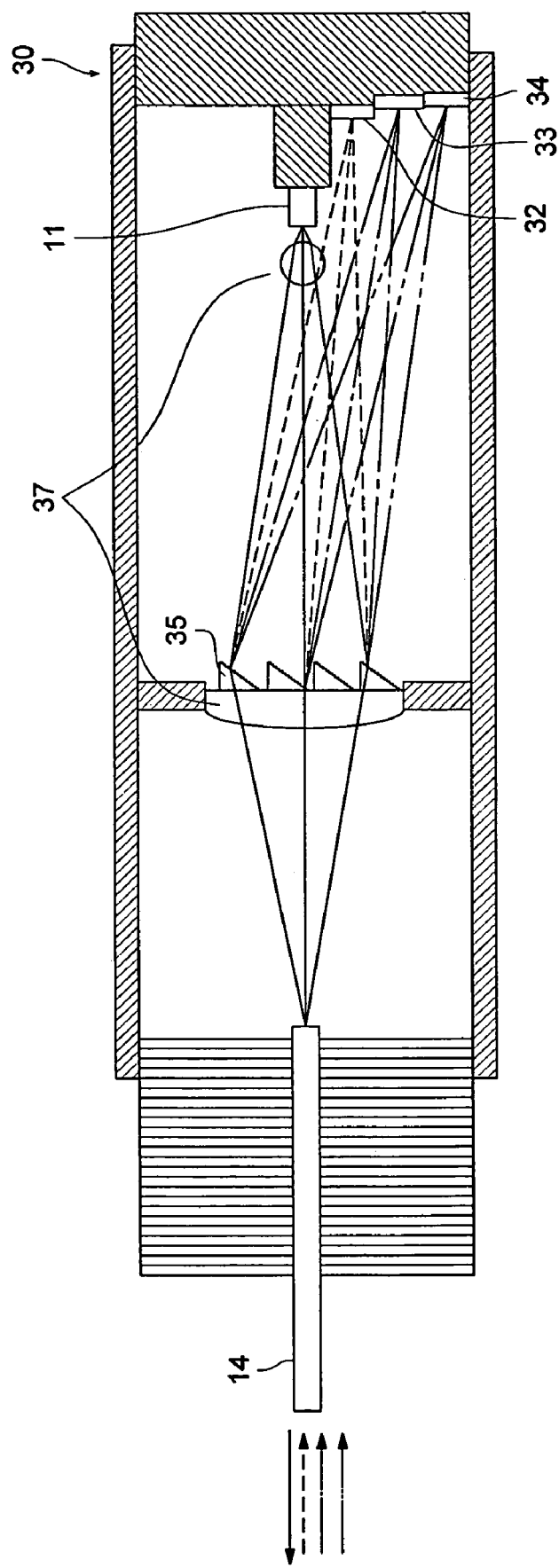
FIG. 11 is a conceptual diagram of an optical communication module capable of employing 4 wavelengths.

FIG. 11 is optical communication module 30 for four wavelengths which is constructed in the same way as in the optical communication module 1 in FIG. 1. In the present embodiment 2, however, there are arranged in a casing, coupling optical system 37 having therein diffractive grating member 35 for separating light fluxes each having a different wavelength coming from an optical fiber into light fluxes of three wavelengths $\lambda 2$, $\lambda 3$ and $\lambda 4$, and light-receiving elements 32, 33 and 34 for receiving respectively separated three light fluxes respectively with wavelengths $\lambda 2$, $\lambda 3$ and $\lambda 4$.

In the case of the following four wavelengths including wavelength $\lambda 1$ from a laser, when a diffracted grating member shown in Table 3 is used as the diffractive grating member 35, a laser beam with wavelength $\lambda 1$ emitted from a semiconductor laser is transmitted through diffractive grating member 15 without being diffracted $0^{th}$ order diffracted light flux), in the same way as in the example of three wavelengths, then, is converged by a coupling lens to form an image on end face 14a of optical fiber 14, and light fluxes respectively with wavelengths $\lambda 2$, $\lambda 3$ and $\lambda 4$ emitted from optical fiber 14 are diffracted by the diffractive grating member in different directions $\theta$, $\theta'$ and $\theta''$ ($\theta<\theta'<\theta''$), to enter respective light-receiving elements 32, 33 and 34.

Figure 12:
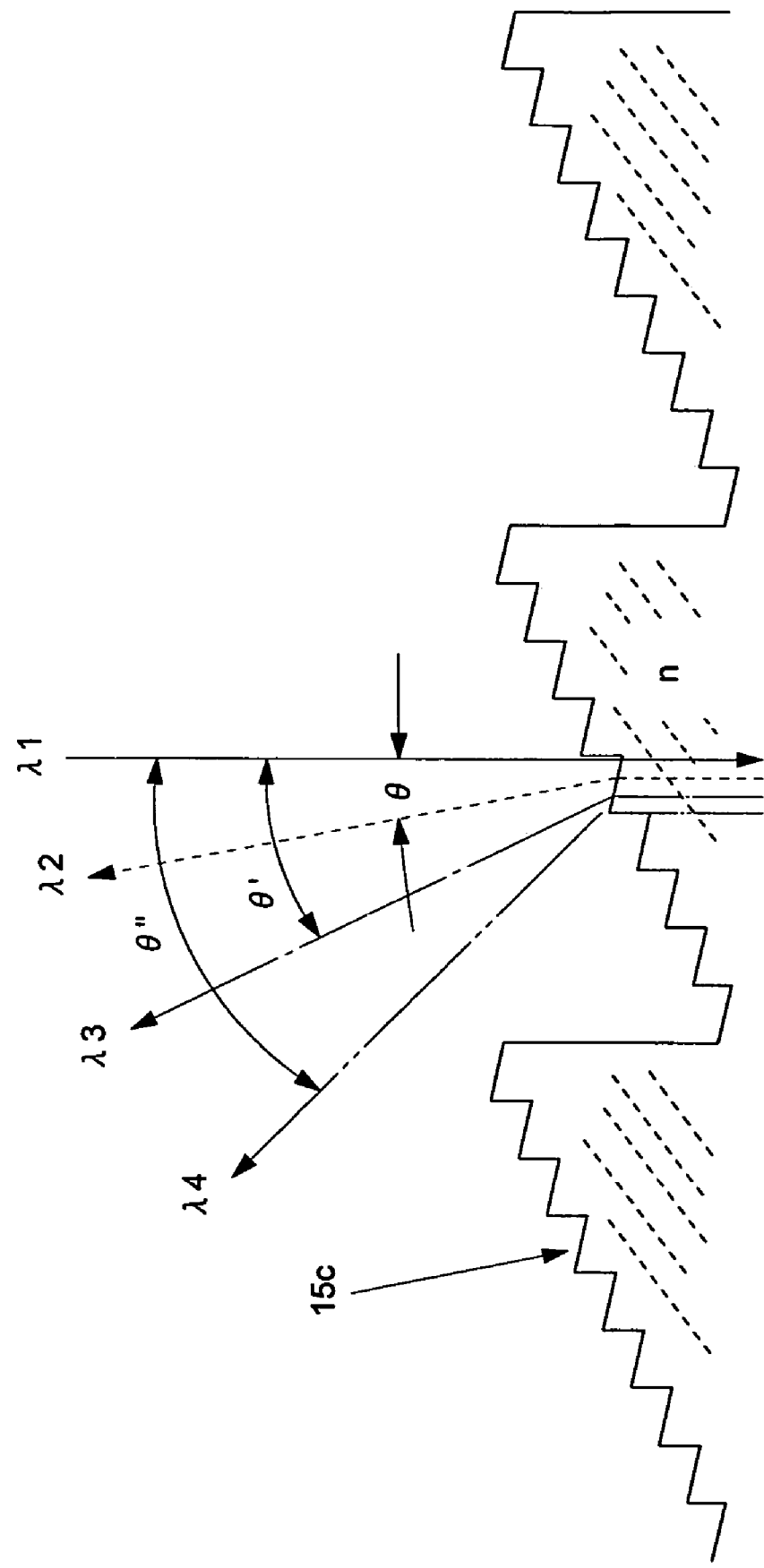
FIG. 12 is an illustration of the angles of diffraction for 4 wavelengths.

Table 3 shows an example wherein the aforesaid four wavelengths include λ1=1310 nm, λ2=1490 nm, λ3=1550 nm and λ4=1610 nm. Incidentally, FIG. 12 is an illustration of the angle of diffraction for four wavelengths, and each of FIGS. 13, 14 and 15 is a schematic sectional view of diffractive grating member 35 in each Example of Table 3.

TABLE 3

| M | Example 8 1.97 | Example 9 2.00 | Example 10 2.02 |
|---|---|---|---|
| Number of diffractive surfaces | 12 | 13 | 14 |
| Order of λ1 | 0 | 0 | 0 |
| Order of λ2 | 3 | 3 | 3 |
| Order of λ3 | 4 | 4 | 4 |
| Order of λ4 | 5 | 5 | 5 |
| Diffraction efficiency λ1 | 57% | 100% | 74% |
| Diffraction efficiency λ2 | 52% | 67% | 70% |
| Diffraction efficiency λ3 | 60% | 65% | 62% |
| Diffraction efficiency λ4 | 54% | 60% | 58% |
| sin θ'/sin θ | 1.39 | 1.39 | 1.39 |
| sin θ"/sin θ | 1.80 | 1.80 | 1.80 |

Even in the Examples 8, 9 and 10, the diffraction order that makes a diffraction efficiency to be maximum varies depending on each wavelength, and light with a longer wavelength is diffracted at a greater diffraction order, thus, a difference of the angle of diffraction between wavelengths can be made large sufficiently.

What is claimed is:

1. An optical communication module, comprising:
   a semiconductor laser;
   a coupling optical system for coupling a first light flux with a wavelength of λ1 emitted by the semiconductor laser to an optical fiber; and
   first and second light-receiving elements for receiving at least second and third light fluxes emitted from an end surface of the optical fiber, the second and third light fluxes each having wavelengths of λ2 and λ3, respectively;
   wherein each of the wavelengths λ1, λ2, and λ3 is a different value,
   wherein the coupling optical system is arranged between the semiconductor laser and the first and second light-receiving elements on a first end of the optical communication module and the optical fiber on a second end of the optical communication module,
   wherein the coupling optical system includes a diffractive structure on at least one surface of the coupling optical system, and
   wherein the coupling optical system changes paths of the first, second, and third light fluxes into different directions, the first light flux entering into the optical fiber, and the second and third light fluxes entering into the first and second light-receiving elements, respectively.

2. The optical communication module of claim 1, wherein the wavelengths λ1, λ2, and λ3 satisfy the following expressions:

1280 nm≦λ1≦1340 nm, 1480 nm≦λ2≦1500 nm, and 1530 nm≦λ3≦1570 nm, wherein the diffractive structure is formed by a plurality of step-shaped grating sections repeatedly provided in a direction perpendicular to an optical axis,
   wherein each of the step-shaped grating sections includes a predefined number of steps, each step having a rising surface portion rising in the optical axis direction and a diffractive surface portion protruding from the rising surface portion,
   wherein each of the steps of the step-shaped grating sections provides an optical path difference which is a multiple of an integer of the first light flux with the wavelength of λ1 passing through adjoining diffractive surface portions, and
   wherein each of the step-shaped grating sections includes 9, 11, or 12 diffractive surface portions.

3. The optical communication module of claim 2,
   wherein each of the step-shaped grating sections includes 9 or 12 diffractive surface portions, and
   wherein each of the steps provides the optical path difference which is approximately twice the first light flux with the wavelength of λ1 passing through the adjoining diffractive surface portions.

4. The optical communication module of claim 2,
   wherein each of the step-shaped grating sections includes 11 or 12 diffractive surface portions, and
   wherein each of the steps provides the optical path difference which is approximately equal to the first light flux with the wavelength of λ1 passing through the adjoining diffractive surface portions.

5. The optical communication module of claim 2,
   wherein each of the step-shaped grating sections includes 12 diffractive surface portions, and
   wherein each of the steps provides the optical path difference which is M times the first light flux with the wavelength of λ1 passing through the adjoining diffractive surface portions, with M satisfying the following expression: 0.9<M<1.1 or 1.9<M<2.1.

6. The optical communication module of claim 2,
   wherein each of the step-shaped grating sections includes 9 diffractive surface portions, and
   wherein each of the steps provides the optical path difference which is M times the first light flux with the wavelength of λ1 passing through the adjoining diffractive surface portions, with M satisfying the following expression: 1.9<M<2.1.

7. The optical communication module of claim 2,
   wherein each of the step-shaped grating sections includes 11 diffractive surface portions, and
   wherein each of the steps provides the optical path difference which is M times the first light flux with the wavelength of λ1 passing through the adjoining diffractive surface portions, with M satisfying the following expression: 0.9<M<1.1.

8. The optical communication module of claim 2,
   wherein each of the step-shaped grating sections includes 11 diffractive surface portions, and
   wherein the diffractive structure produces a $0^{th}$ order diffracted light flux from the first light flux with the wavelength of λ1, produces a first order diffracted light flux having a maximum diffraction efficiency from the second light flux with the wavelength of λ2, and produces a second order diffracted light flux having a maximum diffraction efficiency from the third light flux with the wavelength of λ3.

9. The optical communication module of claim 1,
   wherein the diffractive structure produces diffracted light fluxes having different diffraction orders and maximum diffraction efficiency from the second and third light fluxes emitted from the optical fiber.

10. The optical communication module of claim 9, wherein the diffractive structure produces a diffracted light flux with a larger diffraction order from a light flux with a larger wavelength.

11. The optical communication module of claim 9, wherein the wavelengths λ1, λ2, and λ3 satisfy the following expressions:

1280 nm≦λ1≦1340 nm, 1480 nm≦λ2≦5000 nm, and 1530 nm≦λ3≦1570 nm, and wherein the diffractive structure produces a $0^{th}$ order diffracted light flux from the first light flux with the wavelength of λ1, produces a third order diffracted light flux having a maximum diffraction efficiency from the second light flux with the wavelength of λ2 and produces a fourth order diffracted light flux having a maximum diffraction efficiency from the third light flux with the wavelength of λ3.

12. The optical communication module of claim 9, wherein the wavelengths λ1, λ2, and λ3 satisfy the following expressions:

1280 nm ≦λ1≦1340 nm, 1480 nm ≦λ2≦1500 nm, and 1530 nm ≦λ3≦1570 nm, and wherein the diffractive structure produces a $0^{th}$ order diffracted light flux from the first light flux with the wavelength of λ1, produces a first order diffracted light flux having a maximum diffraction efficiency from the second light flux with the wavelength of λ2, and produces a second order diffracted light flux having a maximum diffraction efficiency from the third light flux with the wavelength of λ3.

13. The optical communication module of claim 9, wherein the wavelengths λ1, λ2, and λ3 satisfy the following expressions:

1280 nm≦λ1≦1340 nm, 1480 nm≦λ2≦1500 nm, and 1530 nm≦λ3≦1570 nm, and wherein the diffractive structure produces a $0^{th}$ order diffracted light flux from the first light flux with the wavelength of λ1, produces a second order diffracted light flux having a maximum diffraction efficiency from the second light flux with the wavelength of λ2, and produces a third order diffracted light flux having a maximum diffraction efficiency from the third light flux with the wavelength of λ3.

14. The optical communication module of claim 2, wherein the diffractive surface portion is inclined to reduce a height of the diffractive surface portion in a direction where a height of each of the step-shaped grating sections increases, and wherein the diffractive structure transmits the entering first light flux with the wavelength of λ1, and diffracts the entering second and third light fluxes, each having the wavelengths of λ2 and λ3, to produce diffracted light fluxes having different diffractive orders.

15. A diffractive grating member for separating light fluxes each having different wavelengths λ1, λ2, and λ3, comprising:

a diffractive-grating section formed on a surface of the diffractive grating member in a direction perpendicular to an optical axis; and a plurality of step-shaped grating sections repeatedly provided on the diffractive-grating section in the direction perpendicular to the optical axis;

wherein each of the step-shaped grating sections includes a predefined number of steps, each step having
a rising surface portion rising in the optical axis direction, and
a diffractive surface portion protruding from the rising surface portion, wherein each of the steps of the step-shaped grating sections provides an optical path difference which is a multiple of an integer of a first light flux with the wavelength of λ1 passing through adjoining diffractive surface portions, and wherein each of the step-shaped grating sections includes 9, 11, or 12 diffractive surface portions.

16. The diffractive grating member of claim 15, wherein the wavelengths λ1, λ2, and λ3 satisfy the following expressions:

1280 nm≦λ1≦1340 nm, 1480 nm≦λ2≦1500 nm, and 1530 nm≦λ3≦1570 nm, and wherein each of the steps provides an optical path difference which is approximately equal to the first light flux with the wavelength of λ1 passing through adjoining diffractive surface portions.

17. The diffractive grating member of claim 16, wherein each of the steps provides the optical path difference which is M times the first light flux with the wavelength of λ1 passing through the adjoining diffractive surface portions, with M satisfying the following expression: 0.9<M<1.1 or 1.9<M<2.1.

18. The diffractive grating member of claim 15, wherein a rising surface portion positioned at an end portion of the plurality of step-shaped grating sections has a largest step difference among the other rising surface portions and inclines in a direction toward a lower step of the step-shaped grating section.

19. The optical communication module of claim 1, wherein the first and second light-receiving elements receive at least the second and third light fluxes and a fourth light flux, each light flux having wavelengths of λ2, λ3 and λ4, respectively, emitted from an end surface of the optical fiber, wherein the wavelengths λ1, λ2, λ3 and λ4 satisfy the following expressions:

1280 nm≦λ1≦1340 nm, 1480 nm≦λ2≦1500 nm, 1530 nm≦λ3≦1570 nm, and 1600 nm≦λ4≦1620 nm, wherein the diffractive structure is formed by a plurality of step-shaped grating sections repeatedly provided in a direction perpendicular to an optical axis, wherein each of the step-shaped grating sections includes a predefined number of steps, each step having a rising surface portion rising in the optical axis direction, and a diffractive surface portion protruding from the rising surface portion, wherein each of the step-shaped grating sections provides an optical path difference which is a multiple of an integer of the first light flux with the wavelength of $\lambda 1$ passing through adjoining diffractive surface portions, and wherein each of the step-shaped grating sections includes 12, 13, or 14 diffractive surface portions.

20. The optical communication module of claim 19, wherein each of the steps of the diffractive structure provides the optical path difference which is M times the first light flux with the wavelength of $\lambda 1$ passing through the adjoining diffractive surface portions, with M satisfying the following expression: $1.9 < M < 2.1$.

21. The optical communication module of claim 19, wherein the wavelengths $\lambda 1$, $\lambda 2$, $\lambda 3$ and $\lambda 4$ satisfy the following expressions:

$1280 \text{ nm} \leq \lambda 1 \leq 1340 \text{ nm}$, $1480 \text{ nm} \leq \lambda 2 \leq 1500 \text{ nm}$, $1530 \text{ nm} \leq \lambda 3 \leq 1570 \text{ nm}$, and $1600 \text{ nm} \leq \lambda 4 \leq 1620 \text{ nm}$, and wherein the diffractive structure produces a $0^{th}$ order diffracted light flux from the first light flux with the wavelength of $\lambda 1$, produces a third order diffracted light flux having a maximum diffraction efficiency from the second light flux with the wavelength of $\lambda 2$, produces a fourth order diffracted light flux having a maximum diffraction efficiency from the third light flux with the wavelength of $\lambda 3$ and produces a fifth order diffracted light flux having a maximum diffraction efficiency from the fourth light flux with the wavelength of $\lambda 4$.

22. The optical communication module of claim 19, wherein the diffractive surface portion is inclined to reduce a height of the diffractive structure in a direction where a height of each of the step-shaped grating sections increases, and wherein the diffractive structure transmits the entering first light flux with the wavelength of $\lambda 1$, and diffracts the entering second and third light fluxes, each having the wavelengths of $\lambda 2$, $\lambda 3$ and $\lambda 4$, to produce diffracted light fluxes having different diffractive orders.

23. A diffractive grating member for separating light fluxes each having different wavelengths $\lambda 1$, $\lambda 2$, $\lambda 3$, and $\lambda 4$, comprising:

a diffractive-grating section formed on a surface of the diffractive grating member in a direction perpendicular to an optical axis; and a plurality of step-shaped grating sections repeatedly provided on the diffractive-grating section in the direction perpendicular to the optical axis;

wherein each of the step-shaped grating sections includes a predefined number of steps, each step having a rising surface portion rising in the optical axis direction, and a diffractive surface portion protruding from the rising surface portion, wherein each of the steps of the step-shaped grating sections provides an optical path difference which is a multiple of an integer of a first light flux with the wavelength of $\lambda 1$ passing through adjoining diffractive surface portions, and wherein each of the step-shaped grating sections includes 12, 13, or 14 diffractive surface portions.

24. The diffractive grating member of claim 23, wherein the wavelengths $\lambda 1$, $\lambda 2$, $\lambda 3$, and $\lambda 4$ satisfy the following expressions:

$1280 \text{ nm} \leq \lambda 1 \leq 1340 \text{ nm}$, $1480 \text{ nm} \leq \lambda 2 \leq 1500 \text{ nm}$, $1530 \text{ nm} \leq \lambda 3 \leq 1570 \text{ nm}$, and $1600 \text{ nm} \leq \lambda 4 \leq 1620 \text{ nm}$, wherein each of the steps provides the optical path difference which is approximately equal to the first light flux with the wavelength of $\lambda 1$ passing through adjoining diffractive surface portions.

25. The diffractive grating member of claim 24, wherein the steps provides the optical path difference which is M times the first light flux with the wavelength of $\lambda 1$ passing through the adjoining diffractive surface portions, with M satisfying the following expression: $1.9 < M < 2.1$.

26. The diffractive grating member of claim 23, wherein a rising surface portion positioned an end portion of the plurality of step-shaped grating sections has a largest step difference among the other rising surface portions and inclines in a direction toward a lower step of the step-shaped grating section.

* * * * *